(12) United States Patent
Kim et al.

(10) Patent No.: US 10,373,009 B2
(45) Date of Patent: *Aug. 6, 2019

(54) CHARACTER RECOGNITION AND CHARACTER INPUT APPARATUS USING TOUCH SCREEN AND METHOD THEREOF

(71) Applicant: Samsung Electronics Co., Ltd., Gyeonggi-do (KR)

(72) Inventors: Do-Hyeon Kim, Gyeonggi-do (KR); Seong-Taek Hwang, Gyeonggi-do (KR); Hee-Bum Ahn, Seoul (KR); Dong-Hoon Jang, Gyeonggi-do (KR); Mu-Sik Kwon, Seoul (KR); Sang-Wook Oh, Gyeonggi-do (KR); Jeong-Wan Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,248

(22) Filed: Oct. 11, 2017

(65) Prior Publication Data
US 2018/0032831 A1 Feb. 1, 2018

Related U.S. Application Data

(63) Continuation of application No. 14/554,493, filed on Nov. 26, 2014, now Pat. No. 9,811,750, which is a (Continued)

(30) Foreign Application Priority Data

Jul. 31, 2009 (KR) .................. 10-2009-0070657

(51) Int. Cl.
*G06F 3/041* (2006.01)
*G09G 3/36* (2006.01)
(Continued)

(52) U.S. Cl.
CPC .......... *G06K 9/222* (2013.01); *G06F 3/0416* (2013.01); *G06F 3/04883* (2013.01);
(Continued)

(58) Field of Classification Search
CPC ... G06F 1/32; G06F 3/00; G06F 3/033; G06F 3/043; G06F 1/3203; G09G 5/00
See application file for complete search history.

(56) References Cited

U.S. PATENT DOCUMENTS 5,655,136 A 8/1997 Morgan
5,717,939 A 2/1998 Bricklin et al.
(Continued)

FOREIGN PATENT DOCUMENTS

KR 1020080078336 8/2008
KR 1020080079830 9/2008
(Continued)

*Primary Examiner* — Nelson M Rosario
(74) *Attorney, Agent, or Firm* — The Farrell Law Firm, P.C.

(57) ABSTRACT

A character input method using a touch screen, in which one or more areas requiring user input is defined in the touch screen, pre-recognized information is defined for each of the defined areas, character information is received by a user in one or more user desired areas among the defined areas, the character information is recognized using a character recognizer, and the recognized character information is updated in the user desired areas.

21 Claims, 8 Drawing Sheets

Related U.S. Application Data continuation of application No. 12/848,327, filed on Aug. 2, 2010, now Pat. No. 8,917,248.

(51) Int. Cl.
  G06K 9/22    (2006.01)
  G06F 3/0488  (2013.01)
  G06K 9/20    (2006.01)

(52) U.S. Cl.
  CPC ....... *G06F 3/04886* (2013.01); *G06K 9/2054* (2013.01); *G06K 2209/01* (2013.01)

(56) References Cited

U.S. PATENT DOCUMENTS

| | | |
|---|---|---|
| 8,423,916 B2 | 4/2013 | Chihara |
| 9,147,275 B1 | 9/2015 | Hyde-Moyer |
| 2007/0260981 A1* | 11/2007 | Kim .................... G06F 3/04812 |
| | | 715/256 |
| 2008/0016439 A1 | 1/2008 | Leung et al. |
| 2008/0150908 A1 | 6/2008 | Someno |
| 2008/0174561 A1 | 7/2008 | Kim |
| 2008/0174568 A1 | 7/2008 | Kim |
| 2009/0055771 A1 | 2/2009 | Nurmi |
| 2009/0160785 A1 | 6/2009 | Chen et al. |
| 2009/0160814 A1 | 6/2009 | Li et al. |
| 2009/0161958 A1 | 6/2009 | Markiewicz |
| 2009/0202152 A1 | 8/2009 | Takebe et al. |
| 2012/0223920 A1 | 9/2012 | Brooks et al. |
| 2014/0181758 A1 | 6/2014 | Pasquero et al. |
| 2015/0338945 A1* | 11/2015 | Masuda .............. G06F 3/04883 |
| | | 345/174 |

FOREIGN PATENT DOCUMENTS

| | | |
|---|---|---|
| KR | 1020080096732 | 11/2008 |
| WO | WO 2008/105574 | 9/2008 |

* cited by examiner

CHARACTER RECOGNITION AND CHARACTER INPUT APPARATUS USING TOUCH SCREEN AND METHOD THEREOF

PRIORITY

This application is a Continuation Application of U.S. patent application Ser. No. 14/554,493 filed Nov. 26, 2014 and is a Continuation Application of U.S. patent application Ser. No. 12/848,327 filed Aug. 2, 2010 and issued as U.S. Pat. No. 8,917,248 on Dec. 23, 2014, and claims priority under 35 U.S.C. § 119(a) to a Korean Patent Application filed in the Korean Intellectual Property Office on Jul. 31, 2009 and assigned Serial No. 10-2009-0070657, the entire disclosure of each of which is hereby incorporated by reference.

BACKGROUND OF THE INVENTION

1. Field of the Invention

The present invention relates generally to a handwriting recognition and automatic character input method, and more particularly, to an apparatus for allowing a user to handwrite desired information in a defined area on a touch screen and automatically recognizing the information, and a method thereof.

2. Description of the Related Art

Mobile terminals include enhanced features along with the development of all related technologies, including a wired/wireless communication technology, a multimedia technology, a technology for manufacturing hardware such as Central Processing Units (CPUs) and memories, and a power charging technology. Because the conventional mobile terminals have been used mainly for calls, users have felt little inconvenience even though the terminals have only numeric keypad buttons corresponding to phone numbers. However, owing to the increasingly widespread use of text messages, users may be inconvenienced by having to input various types of languages and characters.

Due to the development of mobile terminal-related technology, the existing products such as Personal Digital Assistants (PDAs) and laptop computers, and also many new-concept products including smart phones, Netbooks, Mobile Internet Devices (MIDs) and Ultra Mobile PCs (UMPCs) have been launched. Thanks to the advances in such technologies, it is possible to run a variety of applications in the mobile terminals, which requires a quick and convenient character input method.

The current representative character input methods include a character input method using physical keypad buttons, a character input method using a virtual keypad on a touch screen, and a character input method of recognizing information handwritten on a touch screen. The three different character input methods will be described in detail below.

FIG. 1 illustrates the conventional character input method using physical keypad buttons.

Referring to FIG. 1, a screen for inputting text messages by a user can be displayed on an information display area 101. The mobile terminal includes a key button area 103 with multiple key buttons capable of inputting information, the information display area 101 for outputting a variety of information such as input characters or numbers and special characters, and multiple menu key buttons 105 and 107. A function capable of selecting Hangul, English, numbers and special characters may be included not only in a menu key button but also in a preset button, and the user can input desired characters by pressing associated keys with characters printed on them in the key button area 103. The user can compose desired text messages using the above structures.

FIG. 2 illustrates the conventional character input method using a virtual keypad on a touch screen.

Referring to FIG. 2, the touch screen can display a particular screen or an input screen with a virtual keypad by user input. A message input screen displayed on a touch screen 201 includes a key button area 203 with multiple key buttons capable of inputting information, a special key area 205 with multiple key buttons capable of selecting Hangul, English, numbers and special characters, an information display area 207 for outputting a variety of information such as characters or numbers and special characters being input by touches, and multiple menu key buttons 209 and 211.

In the case of the message input screen shown in FIG. 2, the same environment as the environment of composing messages using the physical keypad buttons shown in FIG. 1 may be implemented on the touch screen. Hence, the user can compose messages in the same way as the method of composing messages using the physical keypad buttons, with use of the key button area 203, the special key area 205 and the information display area 207, all of which are displayed on the touch screen 201.

FIG. 3 illustrates the conventional character input method using handwriting recognition on a touch screen.

Referring to FIG. 3, a touch screen 301 can display a particular screen by user input, i.e., can display an input screen different from the input screen with a virtual keypad shown in FIG. 2. A message input screen displayed on the touch screen 301 includes special key areas 303 with multiple key buttons capable of selecting Hangul, English, numbers and special characters, a handwriting recognition area 305 for directly inputting information using a finger or a stylus pen, an information display area 307 for outputting a variety of information such as characters or numbers and special characters being input by touch, and multiple menu key buttons 309 and 311.

In the message input screen shown in FIG. 3, the handwriting recognition area 305 includes three single-recognition areas for recognizing one character or number and special character at a time, and user desired information is displayed on the information display area 307 in the order that the information is input by an input tool, e.g. a finger or a stylus pen. To switch from Hangul to English, or from Hangul to other characters or numbers and special characters, the user may choose a predefined button in the special key areas 303 and then enter desired characters. Thus, the user may compose messages as if writing on a notebook by hand, using the information display area 307, the menu key buttons 309 and 311, and the handwriting recognition area 305 displayed on the touch screen 301.

However, in the case of the character input method using physical keypad buttons, to change specific settings of the mobile terminal or to set application information through character entry, the user must navigate to a pertinent input window by pressing particular menu or search buttons. Due to the limited number of keypad buttons, multiple characters are assigned to each button even for the same language to allow the user to enter various characters, so the user must enter the buttons selectively or in combination. This character input method inconveniences users who want fast text input.

The character input method using a virtual keypad on the touch screen also suffers from space limitations similar to those of the character input method using the physical keypad buttons, since the virtual keypad must be placed in the touch screen. This character input method is not so different from the character input method using physical keypad buttons in terms of the inconvenience to the user. In addition, to change a type of characters (numbers, uppercase English, lowercase English, Hangul, special characters, etc.) in the input window, the user needs to press particular keys for the character type change, which inevitably decreases the input speed.

Compared with the character input method using keypad buttons, the character input method using handwriting recognition on the touch screen is advantageous in that it can input characters by recognizing patterns of handwriting the user has entered without using keypad buttons, contributing to saving the keypad space. However, this method also needs additional setting tasks to change the character type, and in order to correct some of the input information, the user must choose the information to be corrected on the touch screen, delete the selected information, and then input the desired information.

SUMMARY OF THE INVENTION

An aspect of the present invention is to address at least the above-mentioned problems and/or disadvantages and to provide at least the advantages described below. Accordingly, an aspect of the present invention is to resolve the difficulties a user may suffer when entering characters in a mobile terminal.

Another aspect of the present invention provides an apparatus and method for inputting characters by allowing a user to directly handwrite the characters in a desired input field using an input tool, for example a stylus pen, without complex moving and/or setting processes.

In accordance with an aspect of the present invention, there is provided a character input method using a touch screen, including displaying, on the touch screen, at least one area partitioned based on selecting a character; displaying a first character at a first area among the displayed at least one area and a second character at a second area among the displayed at least one area; receiving character information at the first area by the touch screen; selecting the first character associated with a position of the character information in the first area as a character to be replaced among the first character and the second character; and displaying a third character at the first area in accordance with the received character information to replace the first character displayed at the first area.

In accordance with another aspect of the present invention, there is provided an electronic device that includes a touch screen and at least one processor that is configured to control the touch screen to display at least one area partitioned based on selecting a character, control the touch screen to display a first character at a first area among the displayed at least one area and a second character at a second area among the displayed at least one area, receive character information at the first area by the touch screen, select the first character associated with a position of the character information in the first area as a character to be replaced among the first character and the second character, and control the touch screen to display a third character at the first area in accordance with the received character information to replace the first character displayed at the first area.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE PRESENT INVENTION

Figure 1:
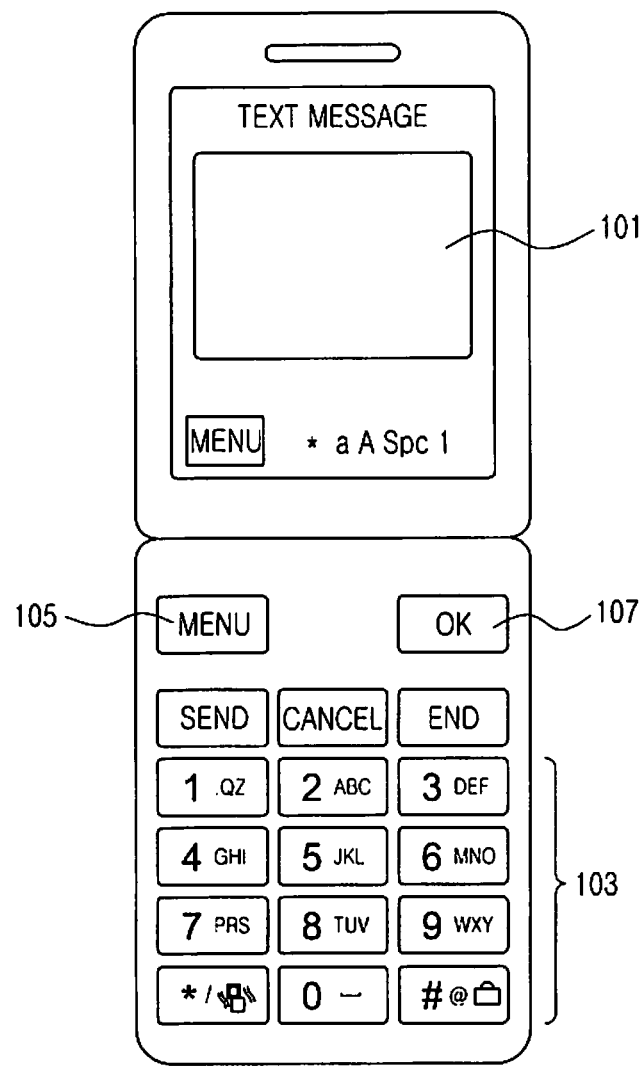
FIG. 1 is a diagram illustrating the conventional character input method using physical keypad buttons.
Figure 2:
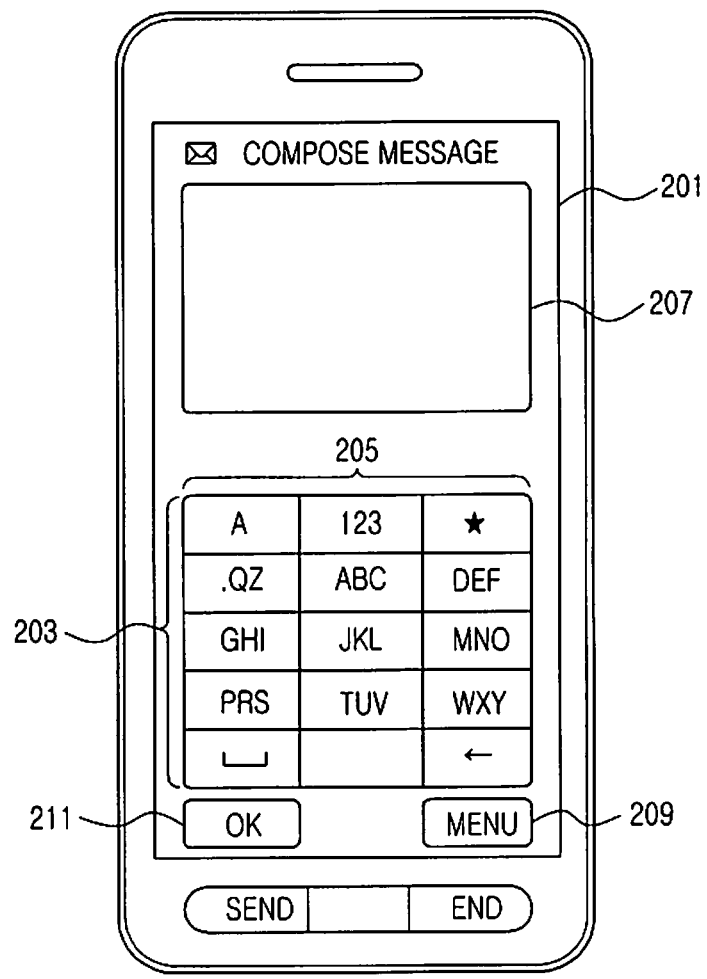
FIG. 2 is a diagram illustrating the conventional character input method using a virtual keypad on a touch screen.
Figure 3:
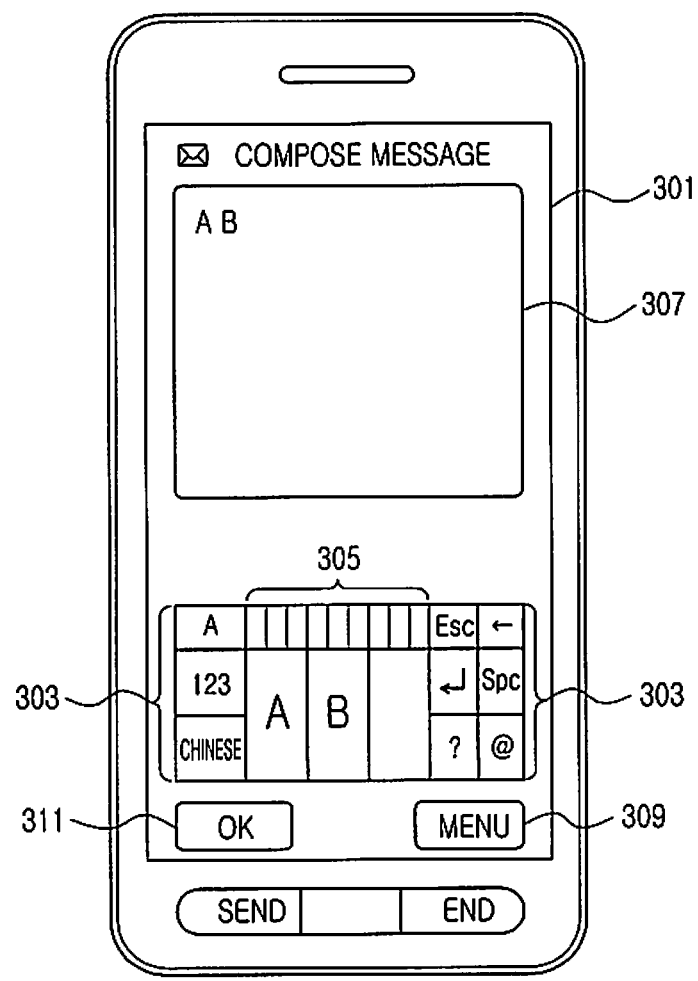
FIG. 3 is a diagram illustrating the conventional character input method using handwriting recognition on a touch screen.

Preferred embodiments of the present invention will now be described in detail with reference to the annexed drawings. The embodiments described herein and structures shown in the drawings are merely illustrative and do not cover every technical spirit of the invention. Therefore, it will be understood that various modifications which can substitute for the embodiments can be made at the time of filing the present application.

Figure 4:
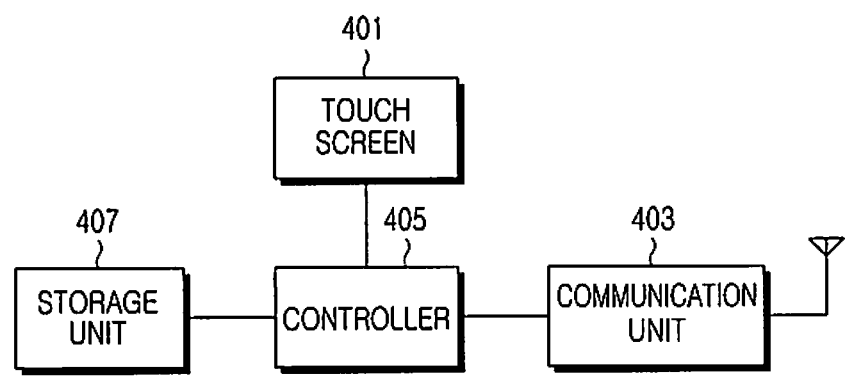
FIG. 4 is a block diagram illustrating an internal structure of a mobile terminal with a touch screen according to an embodiment of the present invention.

FIG. 4 illustrates an internal structure of a mobile terminal with a touch screen according to an embodiment of the present invention. The mobile terminal includes a touch screen 401, a communication unit 403, a controller 405, and a storage unit 407.

Referring to FIG. 4, the touch screen 401 is used to receive information and/or control commands and transmit the received information and/or control commands to the controller 405 through user input. The touch screen 401 may also receive user input information from the controller 405 and display the received input information.

As mentioned above, the touch screen 401 may include input areas for receiving handwritten information that the user has entered in a touch manner using an input tool, e.g. a finger or a stylus pen, and output areas for displaying patterns or recognized results (or recognized characters) of the received handwritten information. The input areas and the output areas are provided on the touch screen 401, and can overlap each other.

The communication unit 403 exchanges call-related voice signals and multimedia data with other mobile terminals over the mobile communication network, and provides the information to the controller 405. The communication unit 403 may also receive information to be transmitted to other terminals from the controller 405, and transmit the information to the mobile communication network.

The controller 405 receives desired information from the user, and displays it on the touch screen 401. To be more specific, the controller 405 receives handwritten information from the input areas on the touch screen 401, selects a proper handwritten-character recognizer, recognizes the user handwritten information using the selected handwritten-character recognizer, and then displays the recognized results on the output areas of the touch screen 401.

The storage unit 407 includes (or stores) one or more handwritten-character recognizers for recognizing information entered through the touch screen 401. In addition, the storage unit 407 may store an Operating System (OS) needed to drive the mobile terminal, and may also store various types of images and icons. Also, the storage unit 407 may store preset gestures. In this regard, if the user handwrites characters corresponding to user preset gestures, the controller 405 receives the associated results from the storage unit 407 and displays them on the touch screen 401.

A process of recognizing user handwritten characters and automatically inputting the recognized characters using the aforementioned block diagram will be described with reference to the following flowchart.

Figure 5:
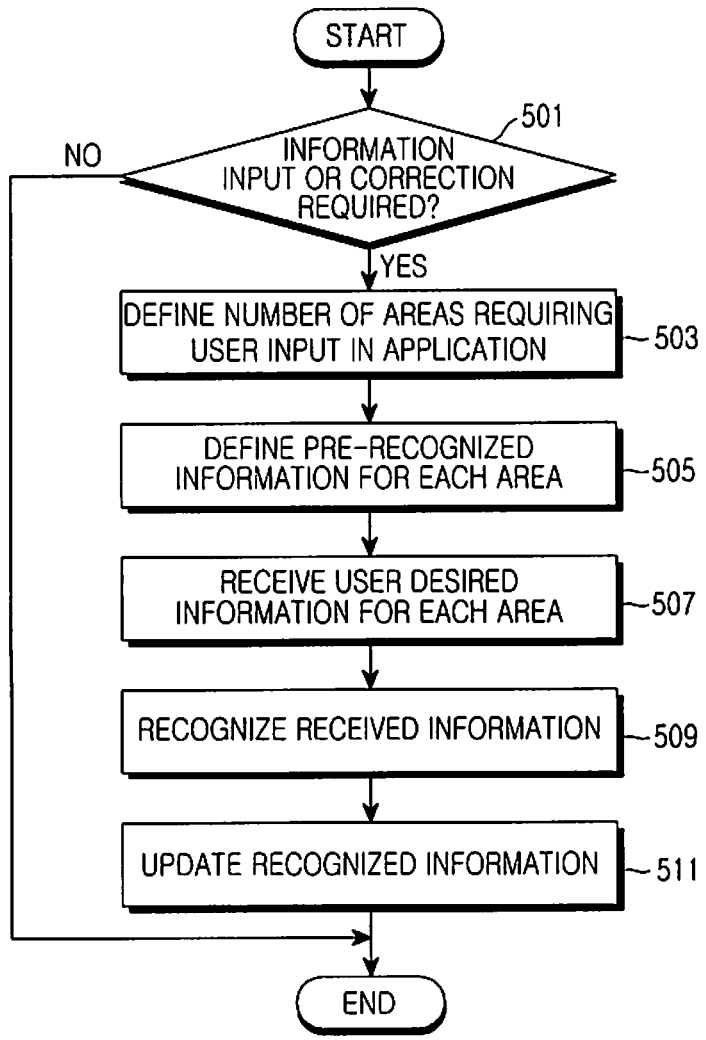
FIG. 5 is a flowchart illustrating a process of inputting and outputting information using a touch screen in a mobile terminal according to an embodiment of the present invention.

FIG. 5 illustrates a process of inputting and outputting information using a touch screen in a mobile terminal according to an embodiment of the present invention.

Referring to FIG. 5, a controller determines in step 501 whether entry of new information or correction of old information is required, and if so, the controller runs a pertinent application. In step 503, the controller defines the number of areas requiring user input in the application. For example, to simply correct the current time, it is possible to separate an hour displaying area and a minute displaying area, with the current time displayed on the touch screen. In this case, the entire area is divided into two areas. A process of defining the number of areas may be determined differently depending on the type or use environment of the application.

If the number of areas requiring user input is defined, the controller defines pre-recognized information for each of the defined areas in step 505. The pre-recognized information associated with each area includes information about a location occupied by the area on the touch screen, and information about a character recognizer that is used for the area and recognizes user handwriting patterns. The area-specific character recognizer information is information linked to a handwritten character recognizer for recognizing handwriting patterns in the pertinent input area. For example, in the case of entering a phone number, since the characters to be recognized are limited to numbers, only a low-capacity, high-performance handwritten-character recognizer capable of recognizing only numbers may be used without the need to use a general-purpose handwritten-character recognizer capable of recognizing all types of characters, including Hangul, English, and Chinese characters. In this manner, in many cases, different types of characters may be entered depending on the features of the areas. Therefore, if a proper handwritten-character recognizer is used for each area, the accuracy of handwritten-character recognition can be increased.

In step 507, the controller receives user desired characters through input areas on the touch screen, for the respective areas. Regarding an input method, if the user handwrites characters in pertinent areas on the touch screen using a finger or a stylus pen, the controller receives a series of handwritten coordinate data, or handwriting patterns, from the input areas on the touch screen. In step 509, the controller recognizes the received information using a character recognizer. Since different character recognizes are defined for the respective areas, the controller recognizes the input handwriting patterns without the process of selecting a character recognizer. The recognized characters are updated in their output areas on the touch screen in step 511. If characters are already displayed in the user desired areas, new characters may be pre-displayed in the associated output areas. In the present invention, because the input areas and the output areas are provided overlapping with each other, old characters and new characters may be different in color or shading level to distinguishing the different characters.

If a predetermined time has elapsed after the user handwriting is input, the controller determines the midpoint of the handwritten coordinate data, and compares the midpoint with location information of each area to determine to which input area the input action corresponds. The user handwriting patterns are recognized by the character recognizer linked to the input areas where the input action has occurred, and the recognized characters are displayed on the output areas of the touch screen, replacing the old input information. In this process, since the old characters are updated (or replaced) with the new characters by simply inputting the new characters, the user does not need to delete the old input characters.

A process of updating characters based on the above flowchart will be described with reference to the following drawings.

Figure 6:
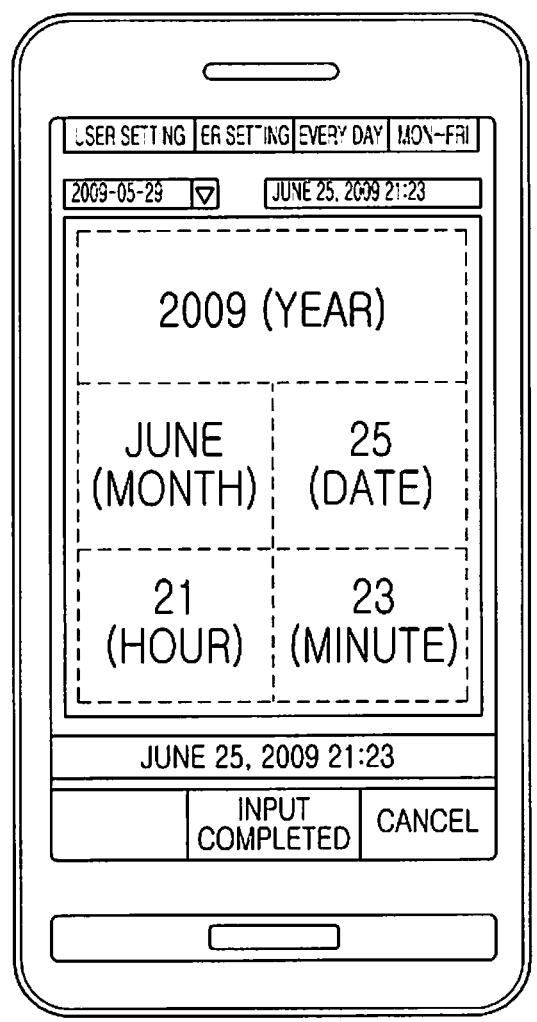
FIG. 6 is a diagram illustrating an example of displaying pre-entered information and dividing input areas according to an embodiment of the present invention.

FIG. 6 illustrates an example of displaying pre-entered information and dividing input areas according to an embodiment of the present invention. While an alarm setting application is considered in FIG. 6, the present invention may be applied to other applications.

Referring to FIG. 6, the touch screen is divided into five input areas: a Year area, a Month area, a Date area, an Hour area, and a Minute area. Although the areas are partitioned by dotted lines in the drawing, the dotted lines can be displayed or removed depending on user choice. If the five input areas are defined, pre-recognized information is defined for each of the areas. Since the alarm setting application needs only a character recognizer for recognizing only the numbers, all of the five input areas have the same character recognizer.

Figure 7A:
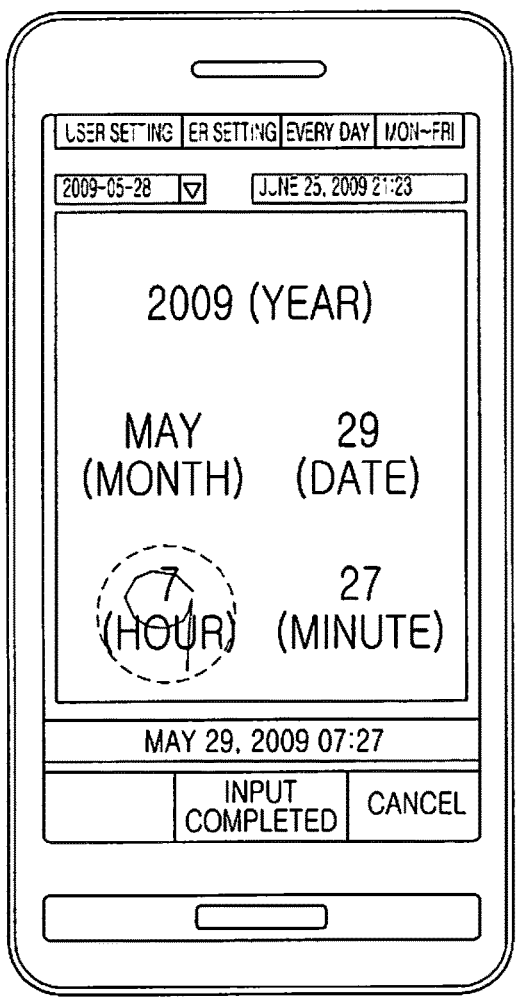
FIGS. 7A to 8B are diagrams illustrating examples of updating areas requiring user input and correction according to an embodiment of the present invention.
Figure 7B:
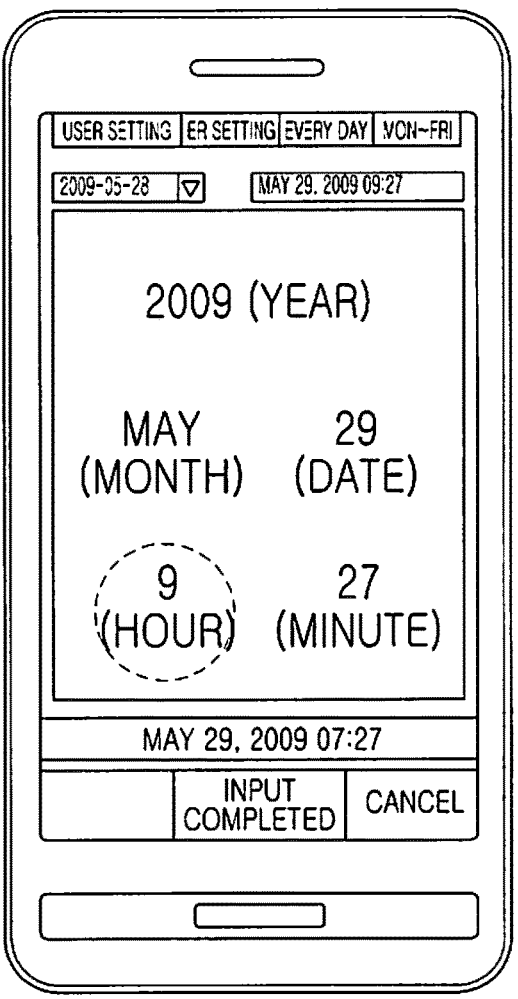
Figure 8A:
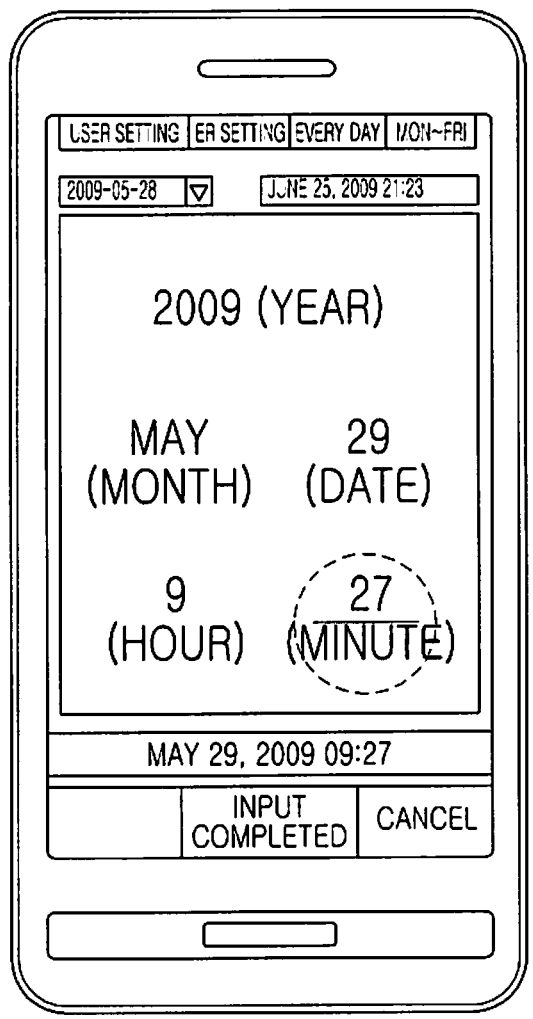
Figure 8B:
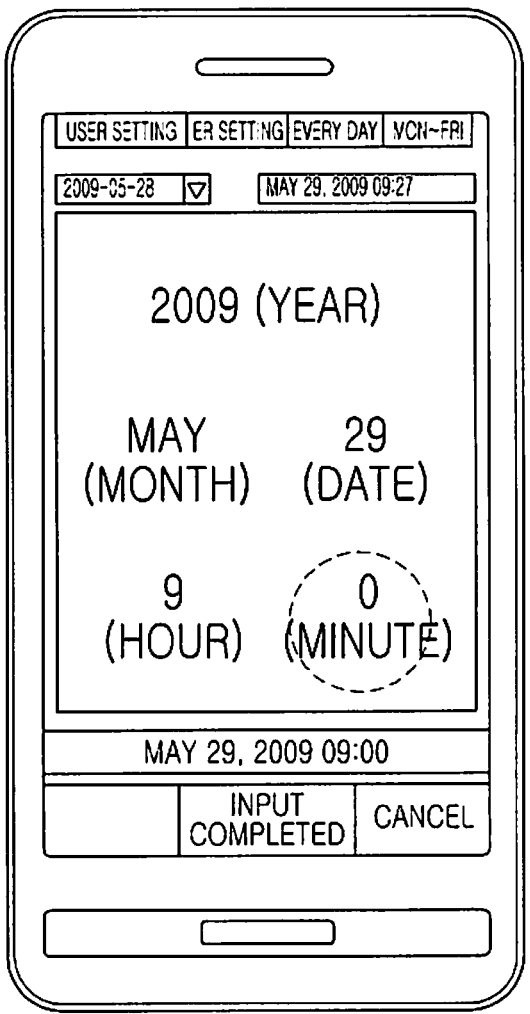

FIGS. 7A to 8B illustrate updating areas requiring user input and correction according to an embodiment of the present invention. FIGS. 7A and 7B illustrate updating a character by directly handwriting a different character in a pertinent area, and FIGS. 8A and 8B illustrate updating a character by handwriting a preset gesture.

Referring to FIGS. 7A and 7B, if a user wants to correct an Hour-related character, the user handwrites a character "9" in the area on which a character "7" was originally displayed, as shown in FIG. 7A. If the handwritten character is provided to the controller through an input area associated with the area, the character recognizer linked to the area recognizes the handwritten character "9." The handwritten character "9" is displayed in a different color on the old character "7," and the Hour data is updated from "7" to "9" upon user input, as shown in FIG. 7B. Depending on setting of the update process, the Hour data may be automatically updated upon recognition of the handwritten character, without the user input.

Referring to FIGS. 8A and 8B, if a user wants to correct a Minute-related character, the user handwrites a preset simple gesture in the area on which characters "27" were originally displayed, as shown in FIG. 8A. The handwritten gesture is provided to the controller through an input area associated with the area, and the controller analyzes a preset gesture pattern in the area, and updates the old characters with an output value corresponding to the analyzed gesture pattern as shown in FIG. 8B. In an embodiment of the present invention, if a horizontal line is handwritten, the controller performs a gesture of inputting an initial value.

As is apparent from the foregoing description, according to embodiments of the present invention, a touch screen is divided into areas requiring user input, and input areas and output areas can overlap with each other in the respective areas. Thus, the user may directly handwrite characters only in the required areas without using a user interface requiring complex and troublesome input processes, thereby ensuring an intuitive input method.

In addition, pre-recognized environmental information is defined for each area, thus eliminating the need to change character type setting, and character recognizers specific to input areas are pre-selected, thereby improving recognition performance.

According to the present invention, the user can directly handwrite characters in required input areas without the various and troublesome input processes including moving and character type changing provided as a user interface to input characters in input areas requiring user input or correction, thus ensuring an intuitive and convenient character input method and a high character input speed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A character input method using a touch screen, the method comprising:
    displaying a first character and a second character on the touch screen;
    in response to a user input on the touch screen, displaying, on the touch screen, a first indication indicating a first area in which the displayed first or second character is replaceable to another character obtained by using handwritten information;
    receiving character information at the first area by using the touch screen;
    identifying the first character associated with a position of the character information in the first area as a character to be replaced, the first area being partitioned based on the displayed first or second character; and
    displaying a third character at the first area in accordance with the received character information to replace the first character displayed at the first area.

2. The method of claim 1, wherein the at least one indication comprises dotted lines, and
    wherein the dotted lines are selectively displayed or removed when the character selection occurs.

3. The method of claim 1, wherein the first character is superimposed on at least part of the character information when the character selection occurs.

4. The method of claim 1, further comprising:
    recognizing the character information using a character recognizer, wherein the character recognizer is determined among the plurality of character recognizers according to an input feature of one of the first character and the second character.

5. The method of claim 4, wherein the character recognizer for the first character is different from a character recognizer for the second character, and
    wherein the second character has different features from the first character.

6. The method of claim 1, wherein pre-recognized information of the first area is predefined, and
    wherein the pre-recognized information comprises at least one of information about a location of the first area on the touch screen and information about handwriting patterns of the character information to be input into the first area.

7. The method of claim 6, further comprising:
    recognizing the character information using a character recognizer, wherein the character recognizer is determined according to the pre-recognized information of the first area.

8. The method of claim 7, wherein the character recognizer for the first area is different from a character recognizer for the second area, and
    wherein the second area has different pre-recognized information from the first character.

9. The method of claim 1, wherein receiving character information comprises receiving the character information using an input tool, said input tool including at least one of a finger and a stylus pen.

10. The method of claim 1, wherein the first area corresponds to both an input area for inputting the character information and an output area for outputting the first character and the third character.

11. An electronic device comprising:
    a touch screen; and
    at least one processor configured to:
        control the touch screen to display a first character and a second character on the touch screen,
        in response to a user input on the touch screen, display, on the touch screen, a first indication indicating a first area in which the displayed first or second character is replaceable to another character obtained by using handwritten information, the first area being partitioned based on the displayed first or second character,
        receive character information, at the first area by using the touch screen,
        identify the first character associated with a position of the character information in the first area as a character to be replaced, and
        control the touch screen to display a third character at the first area in accordance with the received character information to replace the first character displayed at the first area.

12. The electronic device of claim 11, wherein the at least one indicator comprises dotted lines,
    wherein the dotted lines are selectively displayed or removed when the character selection occurs.

13. The electronic device of claim 11, wherein the at least one processor is further configured to superimpose the first character on the at least part of the character information when the character selection occurs.

14. The electronic device of claim 11, wherein the at least one processor is further configured to recognize the character information using a character recognizer, wherein the character recognizer of the plurality of character recognizers is determined according to an input feature of one of the first character and the second character.

15. The electronic device of claim 14, wherein the character recognizer for the first character is different from a character recognizer for the second character, and
    wherein the second character has different features from the first character.

16. The electronic device of claim 11, wherein the at least one processor is further configured to predefine pre-recognized information of the first area, and wherein the pre-recognized information comprises at least one of information about a location of the first area on the touch screen and information about handwriting patterns of the character information to be input into the first area.

17. The electronic device of claim 16, wherein the at least one processor is further configured to recognize the character information using a character recognizer, and
wherein the character recognizer is determined according to the pre-recognized information of the first area.

18. The electronic device of claim 17, wherein the character recognizer for the first area is different from a character recognizer for the second area, and
wherein the second area has different pre-recognized information from the first character.

19. The electronic device of claim 11, wherein the touch screen is configured to receive the character information using an input tool, said input tool including at least one of a finger and a stylus pen.

20. The electronic device of claim 11, wherein the first area corresponds to both an input area for inputting the character information and an output area for outputting the first character and the third character.

21. A character input method using a touch screen, the method comprising:
 displaying a first character at a first area of the touch screen;
 displaying a second character at a second area of the touch screen;
 defining pre-recognized environmental information for each of the first area of the touch screen and the second area of the touch screen;
 displaying indications indicating the first area and the second area in which displayed information is modifiable using handwritten information and partitioned based on selecting a character;
 receiving, by input on the touch screen, character information at the first area; and
 selecting the first character associated with a position of the character information in the first area as a character to be replaced,
 wherein the defined pre-recognized environmental information eliminates a need for the user to change a character type setting during input on the touch screen.

* * * * *